United States Patent [19]

Huhndorff

[11] Patent Number: 5,332,632
[45] Date of Patent: Jul. 26, 1994

[54] ELECTROCHEMICAL CELLS HAVING MEANS FOR INDICATING THE DEGREE OF CELL BULGING

[75] Inventor: Harry R. Huhndorff, Bay Village, Ohio

[73] Assignee: Eveready Battery Company, Inc., St. Louis, Mo.

[21] Appl. No.: 442,889

[22] Filed: Nov. 29, 1989

Related U.S. Application Data

[63] Continuation of Ser. No. 289,656, Dec. 22, 1988, abandoned.

[51] Int. Cl.$^5$ .............................................. H01M 2/00
[52] U.S. Cl. .......................................... 429/61; 429/90
[58] Field of Search ................ 429/61, 57, 56, 58, 429/59, 66, 62, 90, 121, 122; 320/46, 47, 30, 54

[56] References Cited

U.S. PATENT DOCUMENTS

| | | | |
|---|---|---|---|
| 2,651,669 | 9/1953 | Neumann | 429/58 |
| 3,081,366 | 3/1963 | Belove | 429/58 |
| 3,373,057 | 3/1968 | Jost et al. | 429/58 |
| 3,676,221 | 7/1972 | Bach | 429/61 |
| 3,775,661 | 11/1973 | Frezzolini et al. | 320/46 |
| 4,690,879 | 9/1987 | Huhndorff et al. | 429/61 |
| 4,756,983 | 7/1988 | Tucholski | 429/61 |
| 4,801,514 | 1/1989 | Will et al. | 429/167 |

FOREIGN PATENT DOCUMENTS 1172309  8/1984  Canada ................ 429/157

*Primary Examiner*—Anthony Skapars
*Attorney, Agent, or Firm*—Robert W. Welsh

[57] ABSTRACT

An electrochemical cell has bulge responsive means and a wrap disposed about the cell container, wherein the wrap has two separable sections, with one section secured to the container and the other section in coactive engagement with the bulge responsive means. Upon effective bulging of the cell, the one section of the wrap is noticeably separated from the second section of the wrap.

30 Claims, 3 Drawing Sheets

ELECTROCHEMICAL CELLS HAVING MEANS FOR INDICATING THE DEGREE OF CELL BULGING

This is a continuation of application Ser. No. 07/289,656, filed Dec. 22, 1988, now abandoned.

This invention relates to electrochemical cells having a means for indicating the degree of cell bulging.

Certain electrochemical cells produce gas during the electrochemical reaction. The production of this gas increases the cell's internal pressure and will cause sealed cells to bulge. Also, if these cells experience abuse conditions, such as forced charging of a primary cell, improper placement of a cell in a device, or an internal short circuit, the internal pressure will increase causing the cells to bulge.

There are two basic methods for relieving the pressure increase. One method is to employ a vent in the cell which will open at a predetermined pressure to release the built up gasses. This method has the disadvantage of releasing cell materials into the environment which may cause damage to devices using the cell or to the consumer.

The second method is to use a bulge activated disconnect mechanism to disconnect the internal cell circuit. Although this method does not relieve the increased pressure, it effectively prevents any further pressure increase. Once the circuit has been disconnected, the cell is no longer susceptible to the abuse condition. Examples of highly effective bulge activated circuit interrupters are disclosed in U.S. Pat. No. 4,690,879 and U.S. Pat. No. 4,756,983. A disadvantage is present when many cells are employed in a multicell device. Since the circuit in one of the cells has been disconnected, the device will no longer receive power. However, because the degree of bulge is relatively small there is no way for the consumer to determine which of the cells has bulged sufficiently to disconnect the circuit. Consequently, the consumer may discard unnecessarily cells with useful life remaining.

In view of such disadvantages, it would be desirable to have a means for determining the degree of bulging of electrochemical cells.

SUMMARY OF THE INVENTION

This invention is an electrochemical cell comprising a positive electrode and a negative electrode and an electrolyte contained in a cell container in a manner to establish an effective electrical circuit. The container has a means for responding to bulging of the cell container. The cell further comprises a wrap disposed about the periphery of the container. The wrap has a first wrap section having means for securing to the container, and a second wrap section having a means for separating from the first wrap section. The second wrap section further has means for coacting with the bulge responsive means of the container. The second wrap section is noticeably separated from the first wrap section upon effective bulging of the cell container.

In another aspect, this invention is an electrochemical cell having a means for responding to bulging of the cell container and a wrap disposed about the cell container. The wrap has two sections with one section secured to the container and the second section in coactive engagement with the bulge responsive means. Upon effective bulging of the cell, the two wrap sections are noticeably separated from each other.

The state of discharge or charge of the cells of this invention can be easily and readily observed. The cell can be designed to bulge and activate the separation of the exterior wrap at an effective state of discharge. Also, when used in connection with a bulge activated circuit interrupter, the cell can be designed to activate the separation at the point of interruption of the circuit. Therefore, the consumer can readily determine which cell in a multicell device is substantially discharged or no longer operable.

DETAILED DESCRIPTION OF THE INVENTION

Figure 1:
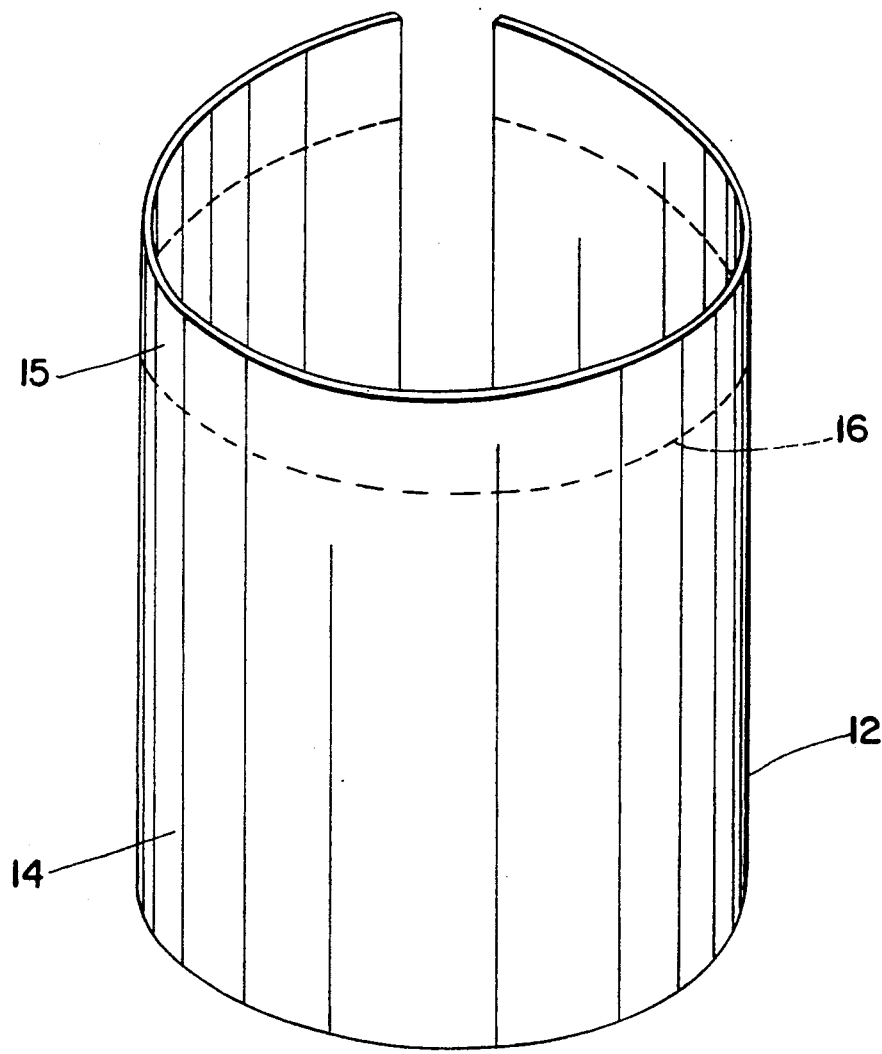
FIG. 1 illustrates a wrap article useful in the present invention.

The wrap article useful in this invention can be any of the known materials used as labels or wraps for electrochemical cells. Examples of known materials are paper, polymeric films and composite films of layers of different materials such as paper, polymeric films, metals and the like. A highly preferred composite film wrap is comprised of multiple layers of polymeric films, and metal foils. When disposed on the cell the wrap has a first section and a second section. Although the two sections can be two separate units which are not in contact with each other, preferably the first wrap section is in separable contact with the second wrap section. The first wrap section is adhered to the cell with a suitable adhesive material. Prior to placement on the cell, the wrap can be a single unit in which the first section is distinguishable from the second section by a perforated or a scored line. Alternatively, the wrap article can be two separate units. This embodiment is less preferred because the application of these two units to a cell is more difficult than the application of a single unit. The wrap can also be in the form of a heat-shrink tube or a strip of material wherein the ends of the strip will be adhered to the container.

The cells of this invention exhibit bulging during discharge or under abuse conditions such as forced discharge, improper charging or the presence of an internal short circuit. The bulging is typically the result of gas formation during the electrochemical reaction. The cell container has a means for responding to the conditions at which bulging occurs. For example, cell containers with a closed end can respond to the bulge conditions at that closed end. Advantageously, such cells can have a cover component attached to this closed end which enhances the observability of the bulge response. Even more advantageously, the covers on such cells can be adapted to provide a bulge-activated circuit interrupter, such as is described in U.S. Pat. Nos. 4,690,879 and 4,756,983, and commonly assigned copending U.S. patent application Ser. No. 237,025, filed on Aug. 29, 1988, all herein incorporated by reference.

Generally, in the cells with bulge-activated circuit interrupters the container is in electrical contact with one of the electrodes. The cover is both in electrical contact with and electrically insulative contact with the container at different points. When the cell bulges, the electrical contacts are broken and the cell circuit is thereby interrupted.

According to this invention, the second wrap section has means for coating with the bulge responsive means of the container. In a container having a bulge responsive end, the coactive means can be effected by the adherence of the second wrap section to the bulge responsive end. A preferred means of adherence is folding the edge of the wrap over the corner of the container and adhering the edge to the bulge responsive end portion rather than the side of the container. Since the first wrap section is secured to the cell container, bulging of the end of the container and coaction of the second wrap section with this bulge will result in a separation of the second wrap section from the first wrap section.

In the circuit interrupting embodiment, since cells bulge under normal operating conditions, the degree of bulge to disconnect the circuit should be controlled so that circuit interruption does not occur during such normal operations or when exposed to storage temperatures. For example, in a standard type alkaline D-size cylindrical cell, which is 2.277 inches high and 1.318 inches in diameter employing a zinc metal anode, manganese dioxide cathode and potassium hydroxide electrolyte, the closed end of the container can bulge about 0.025 inch when stored at 71° C. for about eight weeks. The cell can vent when the bulge exceeds about 0.070 inch. Since venting is undesirable, the circuit interruption should occur prior to the bulge reaching 0.070 inch, and yet the cell should be able to bulge beyond the degree encountered in normal storage and operation.

The preferred circuit interrupter embodiment is a snap-fit cover placed over the bulge-responsive closed-end of the cell container. The snap-fit cover has a terminating dependent flange such that it can be forced onto the closed end of the container to establish an interference fit between the dependent flange and the upstanding wall of the container. The center of the snap-fit cover can be adhered to the closed end of the container by an electrically insulating adhesive. The cover is in electrical contact with the container at the interface between the dependent flange of the cover and the upstanding wall of the container. After effective bulging of the cell container the dependent flange of the cover slides up the wall and out of electrical contact with the container. The second section of the wrap can be secured to the snap-fit cover at least at the dependent flange. Thereby, during bulging, the second wrap section coacts with the snap-fit cover to separate from the first wrap section.

In reference to the drawings, FIG. 1 depicts a wrap 12 useful in the present invention. The wrap 12 has a first section 14 and second section 15. First section 14 is in contact with second section 15 at perforation 16. Perforation 16 provides a means for separating second section 15 from first section 14.

Figure 3:
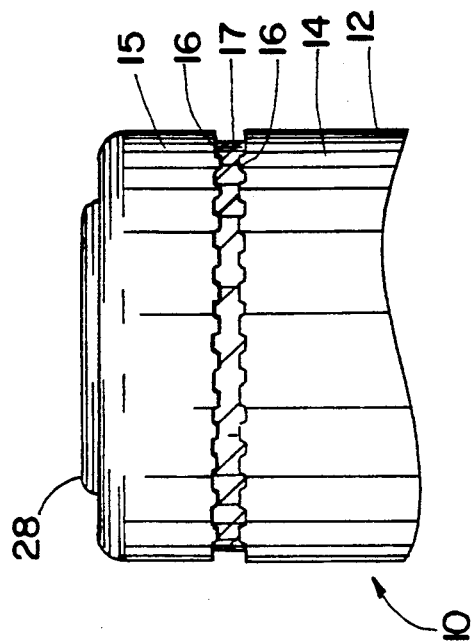
FIG. 3 illustrates the cell of FIG. 2 after bulging has occurred and the wrap has separated.
Figure 2:
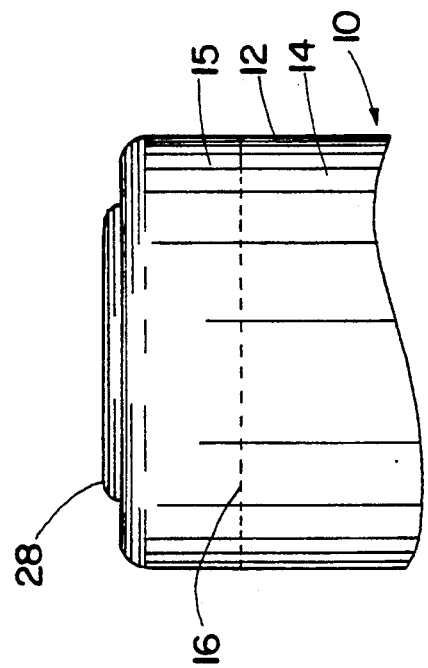
FIG. 2 illustrates a cell covered with a separable wrap according to the present invention.

FIGS. 2 and 3 depict the cells of the present invention having a wrap disposed about the container's periphery. In FIG. 2, a non-bulged cell is illustrated. The cell has container 10 covered by wrap 12. Wrap 12 has first section 14 in contact at perforation 16 with second section 15. The container 10 has terminal cover 28 which is responsive to bulging. Second section 15 is in coactive engagement with cover 28.

Figure 4:
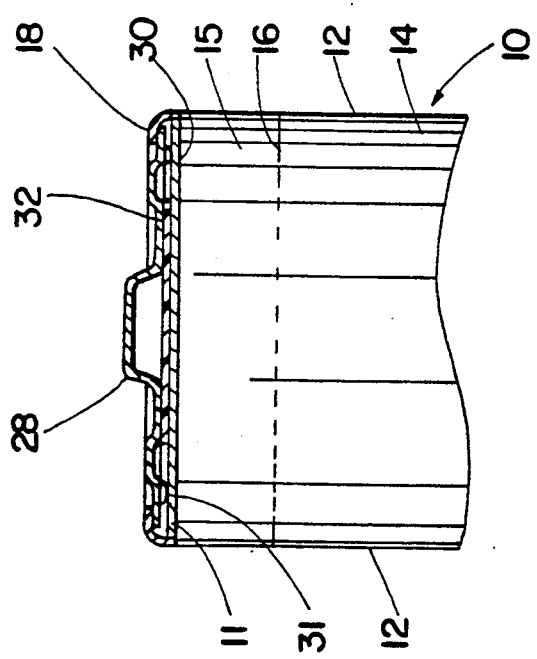
FIG. 4 illustrates a cell having a bulge-activated circuit interrupter and a separable wrap according to an embodiment of the present invention.

FIG. 3 depicts the cell of FIG. 4 after bulging has occurred. Perforation 16 has broken, and there is a noticeable separation 17 between first section 14 of wrap 12 and second section 15 of wrap 12.

Figure 5:
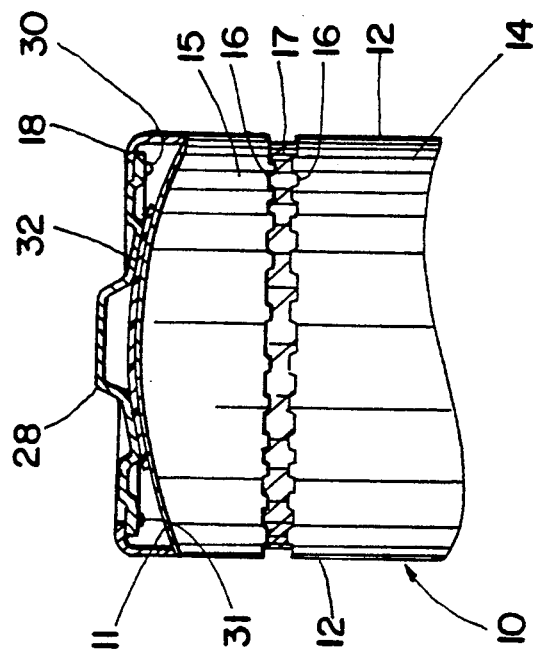
FIG. 5 illustrates the cell of FIG. 2 after bulging has disconnected the circuit and the wrap has separated.

FIGS. 4 and 5 depict a cell having a circuit interrupter according to one embodiment of the invention. In these figures, the portion of the wrap and container enclosing the circuit interrupter means have been removed. In FIG. 4, cell container 10 has bulge responsive closed end 11. Cover 28 is in electrical contact with closed end 11 at welds 31 and 30. Cover 28 is also electrically insulated from closed end 11 by insulating adhesive 32. First section 14 of wrap 12 is attached to the periphery of container 10. Second section 15 of wrap 12 has edge 18 folded onto cover 28 to provide a means for coacting with the bulging of closed end 11 and cover 28. Second section 15 of wrap 12 is in contact with first section 14 at perforation 16. Perforation 16 provides a means for separating second section 15 from first section 14.

In FIG. 5, bulging of the cell has occurred and welds 30 and 31 have been broken to effect circuit interruption of the cell. Second section 15 of wrap 12 has coacted with the bulging of closed end 11 and cover 28 to effect a separation 17 from first section 14.

Although the appearance of the cell container will be an effective noticeable separation, that portion can be highlighted by paint or the inscription of a message to highlight the effect of the separation. Thereby, the consumer can readily observe which cell has bulged due to improper or extended use.

What is claimed:

1. An electrochemical cell comprising a positive electrode and a negative electrode and an electrolyte contained in a cell container in a manner to establish an effective electrical circuit, the container having a means for responding to bulging of the container and having a wrap disposed about the periphery of the container, wherein the wrap has a first wrap section having means for securing to the container, and a second wrap section having means for separating from the first wrap section and also having means for coacting with the bulge responsive means so that the second wrap section is noticeably separated from the first wrap section upon effective bulging of the cell container.

2. The cell of claim 1, wherein the bulge responsive means is a closed end of the cell container.

3. The cell of claim 2, further comprising a means for interrupting the cell circuit in cooperation with the bulge responsive means.

4. The cell of claim 3, wherein the cell container is in electrical contact with one of the electrodes, and the cell circuit interruption means comprises a cover disposed over the closed end of the cell container, a portion of the cover being in electrical contact with the end of the container to establish the cover as a terminal of the cell and another portion of the cover being in electrically insulative contact with the end of the container.

5. The cell of claim 4, wherein the cover has an outer edge which is welded to the container end to establish the electrical contact, and a center portion which is adhered to the closed end by an electrically insulative adhesive.

6. The cell of claim 1, wherein the second wrap section is in separable contact with the first wrap section and the means for separating the first wrap section from the second wrap section is a perforated line.

7. The cell of claim 5, wherein the second wrap section is in separable contact with the first wrap section and the means for separating the first wrap section from the second wrap section is a perforated line.

8. The cell of claim 1, wherein the wrap is comprised of a polymeric film.

9. The cell of claim 6, wherein the wrap is comprised of a polymeric film.

10. The cell of claim 7, wherein the wrap is comprised of a polymeric film.

11. The cell of claim 1, wherein the positive electrode is comprised of manganese dioxide active material, and carbon conductive material, the negative electrode is comprised of zinc active metal, and the electrolyte is comprised of potassium hydroxide.

12. The cell of claim 6, wherein the positive electrode is comprised of manganese dioxide active material, and carbon conductive material, the negative electrode is comprised of zinc active metal, and the electrolyte is comprised of potassium hydroxide.

13. The cell of claim 7, wherein the positive electrode is comprised of manganese dioxide active material, and carbon conductive material, the negative electrode is comprised of zinc active metal, and electrolyte is comprised of potassium hydroxide.

14. The cell of claim 1, wherein the wrap is comprised of paper.

15. The cell of claim 6, wherein the wrap is comprised of paper.

16. The cell of claim 7, wherein the wrap is comprised of paper.

17. The cell of claim 1, wherein the wrap is a composite film.

18. The cell of claim 6, wherein the wrap is a composite film.

19. The cell of claim 7, wherein the wrap is a composite film.

20. The cell of claim 4, wherein the cover is a snap-fit cover with a terminating dependent flange which slides onto and establishes an interference fit with the upstanding wall of the cell container to thereby establish the electrical contact with the container, and wherein the center portion of the cover is adhered to the closed end of the container by an electrically insulative adhesive.

21. The cell of claim 20, wherein the second wrap section is in separable contact with the first wrap section and the means for separating the first wrap section from the second wrap section is a perforated line.

22. The cell of claim 21, wherein the wrap is comprised of a polymeric film.

23. The cell of claim 21, wherein the wrap is comprised of paper.

24. The cell of claim 21, wherein the wrap is a composite film.

25. The cell of claim 24, wherein the wrap is comprised of multiple layers of polymeric films and metal foils.

26. The cell of claim 20, wherein the positive electrode is comprised of manganese dioxide active material, and carbon conductive material, the negative electrode is comprised of zinc active metal, and the electrolyte is comprised of potassium hydroxide.

27. The cell of claim 21, wherein the positive electrode is comprised of manganese dioxide active material, and carbon conductive material, the negative electrode is comprised of zinc active metal, and the electrolyte is comprised of potassium hydroxide.

28. The cell of claim 23, wherein the positive electrode is comprised of manganese dioxide active material, and carbon conductive material, the negative electrode is comprised of zinc active metal, and the electrolyte is comprised of potassium hydroxide.

29. The cell of claim 25, wherein the positive electrode is comprised of manganese dioxide active material, and carbon conductive material, the negative electrode is comprised of zinc active metal, and the electrolyte is comprised of potassium hydroxide.

30. An electrochemical cell having a means for responding to bulging of the cell container and a wrap disposed about the cell container, wherein the wrap has two sections, with one section secured to the container and the second section in coactive engagement with the bulge responsive means, such that upon bulging of the cell, the two sections of the wrap are noticeably separated from each other.

* * * * *